United States Patent
Liu et al.

(10) Patent No.: US 12,302,155 B2
(45) Date of Patent: May 13, 2025

(54) NETWORK DEVICE AND METHOD THEREIN

(71) Applicant: Telefonaktiebolaget LM Ericsson (publ), Stockholm (SE)

(72) Inventors: Chunhui Liu, Beijing (CN); Huaisong Zhu, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 332 days.

(21) Appl. No.: 17/793,433

(22) PCT Filed: Feb. 7, 2020

(86) PCT No.: PCT/CN2020/074518
§ 371 (c)(1),
(2) Date: Jul. 18, 2022

(87) PCT Pub. No.: WO2021/155583
PCT Pub. Date: Aug. 12, 2021

(65) Prior Publication Data
US 2023/0041235 A1    Feb. 9, 2023

(51) Int. Cl.
    H04W 24/10    (2009.01)
    H04B 7/06     (2006.01)
    H04B 17/309   (2015.01)
    H04L 5/00     (2006.01)
    H04W 76/30    (2018.01)

(52) U.S. Cl.
CPC .......... *H04W 24/10* (2013.01); *H04B 7/0626* (2013.01); *H04L 5/0051* (2013.01); *H04W 76/30* (2018.02)

(58) Field of Classification Search
None
See application file for complete search history.

(56) References Cited

U.S. PATENT DOCUMENTS 12,035,269 B2 *  7/2024  Shaheen ............. H04W 60/005
12,177,731 B2 * 12/2024  Shaheen ........... H04W 36/0061
(Continued)

FOREIGN PATENT DOCUMENTS

CN    102461012 A    5/2012
CN    107404764 A   11/2017
(Continued)

OTHER PUBLICATIONS

Vivo, "RP-190833: vivo views on NR Rel-17," 3GPP TSG RAN Meeting #84, Jun. 3-6, 2019, Newport Beach, California, 22 pages.
(Continued)

*Primary Examiner* — Duc T Duong
(74) *Attorney, Agent, or Firm* — Withrow & Terranova, PLLC

(57) ABSTRACT

The present disclosure provides a method in a network device serving a first cell and a second cell. The method includes: determining that a first User Equipment, UE, in the first cell and a second UE in the second cell are associated with one physical terminal device; and enabling, in response to said determining, the terminal device to perform as the first UE, without enabling the terminal device to perform as the second UE, one or more of: measuring a reference signal from the network device, transmitting a reference signal to the network device, or transmitting a measurement report to the network device.

10 Claims, 6 Drawing Sheets

(56) References Cited

U.S. PATENT DOCUMENTS

| | | | |
|---|---|---|---|
| 2011/0077003 A1 | 3/2011 | Shin | |
| 2014/0185495 A1 | 7/2014 | Kuchibhotla et al. | |
| 2015/0065106 A1* | 3/2015 | Catovic | H04W 88/06 455/418 |
| 2017/0367085 A1* | 12/2017 | Chakraborty | H04W 36/0072 |
| 2020/0374833 A1* | 11/2020 | Guo | H04W 8/183 |
| 2020/0396591 A1* | 12/2020 | Ou | H04W 76/30 |
| 2021/0022209 A1* | 1/2021 | Singh | H04L 43/16 |
| 2021/0282103 A1* | 9/2021 | Zhu | H04W 76/15 |
| 2021/0345089 A1* | 11/2021 | Ke | H04W 8/24 |
| 2022/0248322 A1* | 8/2022 | Hong | H04W 48/20 |
| 2022/0264385 A1* | 8/2022 | Hong | H04W 36/0058 |

FOREIGN PATENT DOCUMENTS

| | | |
|---|---|---|
| EP | 3258717 A1 | 12/2017 |
| WO | 2018141081 A1 | 8/2018 |
| WO | 2021092744 A1 | 5/2021 |

OTHER PUBLICATIONS

Extended European Search Report for European Patent Application No. 20917834.2, mailed Jul. 25, 2023, 11 pages.

Author Unknown, "Ran Sharing Solutions: Network Performance Monitoring," 2015, Accedian Networks Inc., 6 pages.

Author Unknown, "Technical Specification Group Radio Access Network; Evolved Universal Terrestrial Radio Access (E-UTRA); Physical channels and modulation (Release 15)," Technical Specification 36.211, Version 15.6.0, Jun. 2019, 3GPP Organizational Partners, 239 pages.

Gao, et al., "Utilization of Channel Reciprocity in Advanced MIMO System," CHINACOM, Aug. 25-27, 2010, Beijing, China, ICST, 5 pages.

Huawei, et al., "R1-167205: UE-cell-center-like Design Principles and Tracking Signal Design," 3GPP TSG RAN WG1 Meeting #86, Aug. 22-26, 2016, Gothenburg, Sweden, 5 pages.

Kumar, et al., "Vulnerability Detection of International Mobile Equipment Identity Number of Smartphone and Automated Reporting of Changed IMEI Number," International Journal of Computer Science and Mobile Computing, vol. 4, Issue 5, May 2015, pp. 527-533.

Neiman, et al., "The Principle of Reciprocity in Antenna Theory," Proceedings of the I.R.E., Dec. 1943, pp. 666-671.

International Search Report and Written Opinion for International Patent Application No. PCT/CN2020/074518, mailed Nov. 10, 2020, 9 pages.

* cited by examiner

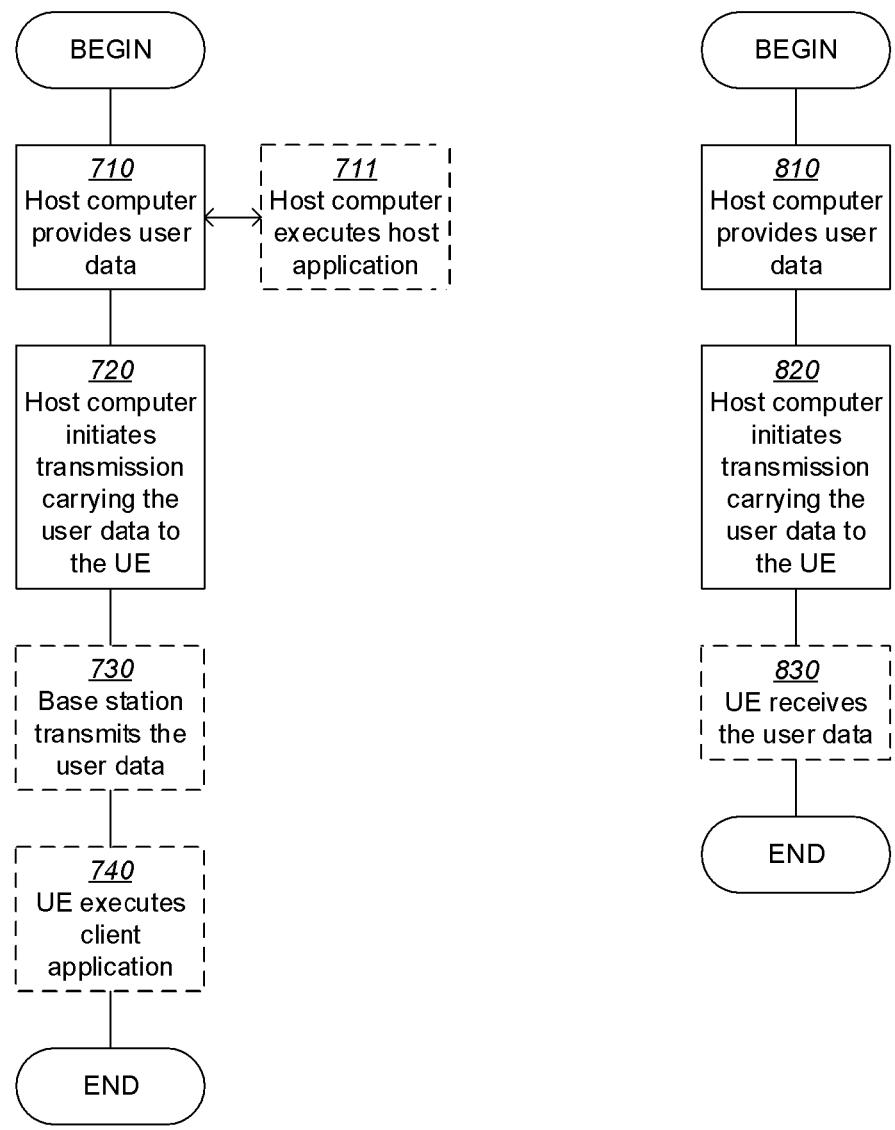

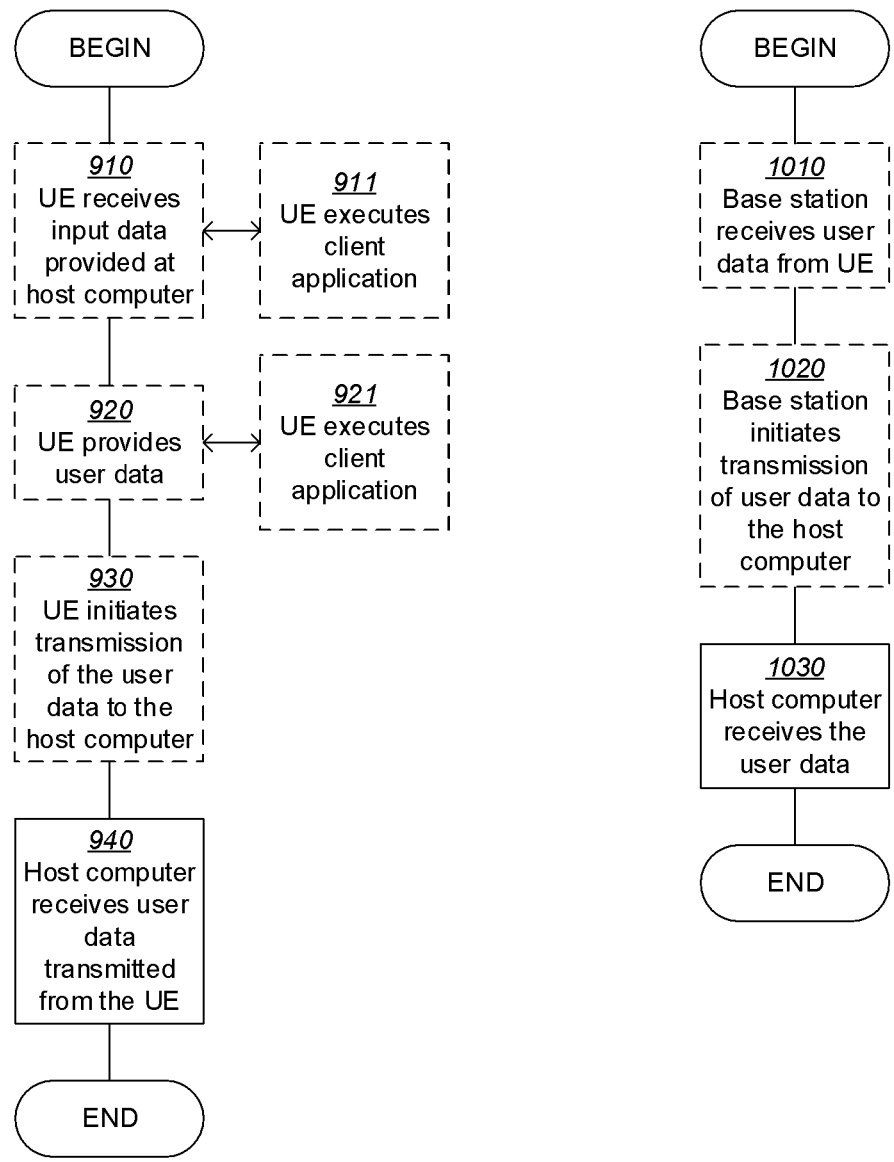

NETWORK DEVICE AND METHOD THEREIN

This application is a 35 U.S.C. § 371 national phase filing of International Application No. PCT/CN2020/074518, filed Feb. 7, 2020, the disclosure of which is incorporated herein by reference in its entirety.

TECHNICAL FIELD

The present disclosure relates to communication technology, and more particularly, to a network device and a method therein.

BACKGROUND

The $5^{th}$ Generation (5G) of mobile communication technology aims to create a fully mobile and connected society, with a tremendous growth in connectivity and density/volume of traffic. In order to build a 5G network in a more cost-effective way, two or more telecommunication operators may collaborate and share their network infrastructures with each other. In general, there can be various forms of network sharing, including for example:
- Mast/Site sharing where operators use same tower sites to co-locate equipment, while everything else is separate,
- Radio Access Network (RAN) sharing where operators share all the equipment in the network, including base station controllers and radio network controllers, and
- Network roaming where competing operators agree to host one another's customers on their networks in certain geographic areas.

FIG. 1 shows a typical scenario of network sharing, known as Multi Operator Core Network (MOCN). As shown, Operator A and Operator B have their respective Core Networks (CNs), CN A and CN B, while sharing one set of radio and baseband (BB) resources with each other, e.g., according to a predefined percentage. Accordingly, a network device, such as a (next) generation NodeB (gNB), can simultaneously serve a cell of Operator A (referred to as Cell A) and a cell of Operator B (referred to as Cell B), which have the same geographic coverage.

In the above MOCN scenario for example, when a terminal device equipped with two Subscriber Identification Modules (SIMs), e.g., SIM A for Operator A and SIM B for Operator B, is connected to both Cell A and Cell B, from the perspective of the gNB, the terminal device will be logically seen as two different User Equipments (UEs), UE 1 associated with SIM A and UE 2 associated with SIM B. The gNB is not aware that UE 1 and UE 2 belong to one single terminal device. This is also the case when the terminal device is equipped with two SIMs for one single operator.

SUMMARY

As the gNB is not aware that UE 1 and UE 2 belong to one single terminal device, it will allocate radio resources for reference signals and/or measurement reports to/from UE 1 and UE 2 separately. However, this could result in an unnecessary waste of the radio resources and/or power consumption at the terminal device, as in this case uplink and/or downlink measurements between the gNB and UE 1 are expected to be the same as those between the gNB and UE 2.

It is an object of the present disclosure to provide a network device and a method therein, capable of avoiding the unnecessary waste as describe above.

According to a first aspect of the present disclosure, a method in a network device is provided. The network device serves a first cell and a second cell. The method includes: determining that a first UE in the first cell and a second UE in the second cell are associated with one physical terminal device; and enabling, in response to the determining, the terminal device to perform as the first UE, without enabling the terminal device to perform as the second UE, one or more of: measuring a reference signal from the network device, transmitting a reference signal to the network device, or transmitting a measurement report to the network device.

In an embodiment, the operation of determining may be based on one or more of: a similarity between first Channel State Information (CSI) reported from the first UE and second CSI reported from the second UE, a similarity between i) a first path loss between the first UE and the network device and ii) a second path loss between the second UE and the network device, and a consistency between first capability or feature information of the first UE and second capability or feature information of the second UE.

In an embodiment, each of the first CSI and the second CSI may include a Channel Quality Indicator (CQI), a Precoding Matrix Indicator (PMI), and/or a Rank Indicator (RI).

In an embodiment, each of the first capability or feature information and the second first capability or feature information may include a UE category.

In an embodiment, the operation of determining may be based further on a coherence between a first channel matrix from the first UE to the network device and a second channel matrix from the second UE to the network device.

In an embodiment, the operation of enabling the terminal device to perform as the first UE, without enabling the terminal device to perform as the second UE, one or more of measuring a reference signal from the network device, transmitting a reference signal to the network device, or transmitting a measurement report to the network device may include one or more of: transmitting to the terminal device an instruction to release a Channel State Information-Reference Signal (CSI-RS) resource allocated to the second UE and transmitting to the terminal device an instruction to refrain from measuring and reporting CSI on the released CSI-RS resource, transmitting to the terminal device an instruction to release a Sounding Reference Signal (SRS) resource allocated to the second UE, and refraining from triggering the terminal device to transmit a power headroom report as the second UE.

In an embodiment, the first cell may be associated with a first operator and the second cell may be associated with a second operator different from the first operator.

In an embodiment, the method may further include: sharing with the second cell a measurement report received from the first UE.

In an embodiment, the first cell and the second cell may share one set of radio and baseband resources.

In an embodiment, the first cell may be same as the second cell.

According to a second aspect of the present disclosure, a network device is provided. The network device includes a transceiver, a processor and a memory. The memory stores instructions executable by the processor whereby the network device is operative to perform the method according to the above first aspect.

According to a third aspect of the present disclosure, a computer readable storage medium is provided. The computer readable storage medium has computer program instructions stored thereon. The computer program instructions, when executed by a processor in a network device, cause the network device to perform the method according to the above first aspect.

With the embodiments of the present disclosure, in response to determining that a first UE in a first cell and a second UE in a second cell are associated with one physical terminal device, a network device serving both the first cell and the second cell can enable the terminal device to perform as only one of the first UE and the second UE, while preventing the terminal device from performing as the other, one or more of: measuring a reference signal from the network device, transmitting a reference signal to the network device, or transmitting a measurement report to the network device. In this way, an unnecessary waste of the radio resources and/or power consumption at the terminal device due to redundant operations associated with reference signals and/or measurement reports can be avoided.

BRIEF DESCRIPTION OF THE DRAWINGS

The above and other objects, features and advantages will be more apparent from the following description of embodiments with reference to the figures, in which:

FIGS. 7 to 10 are flowcharts illustrating methods implemented in a communication system including a host computer, a base station and a user equipment.

DETAILED DESCRIPTION

Figure 1:
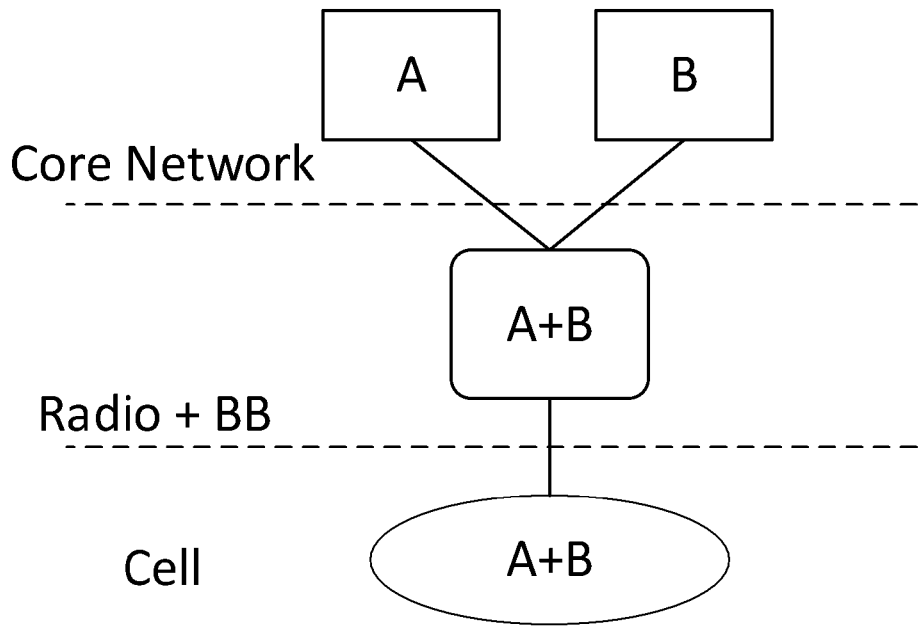
FIG. 1 is a schematic diagram showing an exemplary scenario of MOCN.

As used herein, the term "wireless communication network" refers to a network following any suitable communication standards, such as NR, LTE-Advanced (LTE-A), LTE, Wideband Code Division Multiple Access (WCDMA), High-Speed Packet Access (HSPA), and so on. Furthermore, the communications between a terminal device and a network device in the wireless communication network may be performed according to any suitable generation communication protocols, including, but not limited to, Global System for Mobile Communications (GSM), Universal Mobile Telecommunications System (UMTS), Long Term Evolution (LTE), and/or other suitable 1G (the first generation), 2G (the second generation), 2.5G, 2.75G, 3G (the third generation), 4G (the fourth generation), 4.5G, 5G (the fifth generation) communication protocols, wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards, and/or any other protocols either currently known or to be developed in the future.

The term "network device" refers to a device in a wireless communication network via which a terminal device accesses the network and receives services therefrom. The network device refers to a base station (BS), an access point (AP), or any other suitable device in the wireless communication network. The BS may be, for example, a node B (NodeB or NB), an evolved NodeB (eNodeB or eNB), or (next) generation NodeB (gNB), a Remote Radio Unit (RRU), a radio header (RH), a remote radio head (RRH), a relay, a low power node such as a femto, a pico, and so forth. Yet further examples of the network device may include multi-standard radio (MSR) radio equipment such as MSR BSs, network controllers such as radio network controllers (RNCs) or base station controllers (BSCs), base transceiver stations (BTSs), transmission points, transmission nodes. More generally, however, the network device may represent any suitable device (or group of devices) capable, configured, arranged, and/or operable to enable and/or provide a terminal device access to the wireless communication network or to provide some service to a terminal device that has accessed the wireless communication network.

The term "terminal device" refers to a physical device that can access a wireless communication network and receive services therefrom. By way of example and not limitation, the terminal device refers to a mobile terminal or other suitable devices. The terminal device may be, for example, a Subscriber Station (SS), a Portable Subscriber Station, a Mobile Station (MS), or an Access Terminal (AT). The terminal device may include, but not limited to, portable computers, desktop computers, image capture terminal devices such as digital cameras, gaming terminal devices, music storage and playback appliances, a mobile phone, a cellular phone, a smart phone, voice over IP (VOIP) phones, wireless local loop phones, tablets, personal digital assistants (PDAs), wearable terminal devices, vehicle-mounted wireless terminal devices, wireless endpoints, mobile stations, laptop-embedded equipment (LEE), laptop-mounted equipment (LME), USB dongles, smart devices, wireless customer-premises equipment (CPE) and the like. In the following description, the terms "terminal device" and "terminal" may be used interchangeably. As one example, a terminal device may represent a device configured for communication in accordance with one or more communication standards promulgated by the 3rd Generation Partnership Project (3GPP), such as 3GPP's GSM, UMTS, LTE, and/or 5G standards. As used herein, a "terminal device" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the wireless communication network. Instead, a terminal device may represent a device that is intended for sale to, or operation by, a human user but that may not initially be associated with a specific human user.

The terminal device may support device-to-device (D2D) communication, for example by implementing a 3GPP standard for sidelink communication, and may in this case be referred to as a D2D communication device.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-tomachine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

As used herein, the term "user equipment" or "UE" refers to a logical device associated with a SIM, which can be either a physical SIM card or an embedded SIM (e-SIM), and configured for communication with a network device or any other communication device as appropriate. When equipped with two or more SIMs, a terminal device may be associated with two or more UEs, each of which is seen by a network device as an entity to communicate with.

As used herein, a downlink transmission refers to a transmission from a network device to a terminal device, and an uplink transmission refers to a transmission in an opposite direction.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

The terminology used herein is for the purpose of describing particular embodiments only and is not intended to be liming of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

In the following description and claims, unless defined otherwise, all technical and scientific terms used herein have the same meaning as commonly understood by one of ordinary skills in the art to which this disclosure belongs.

Figure 2:
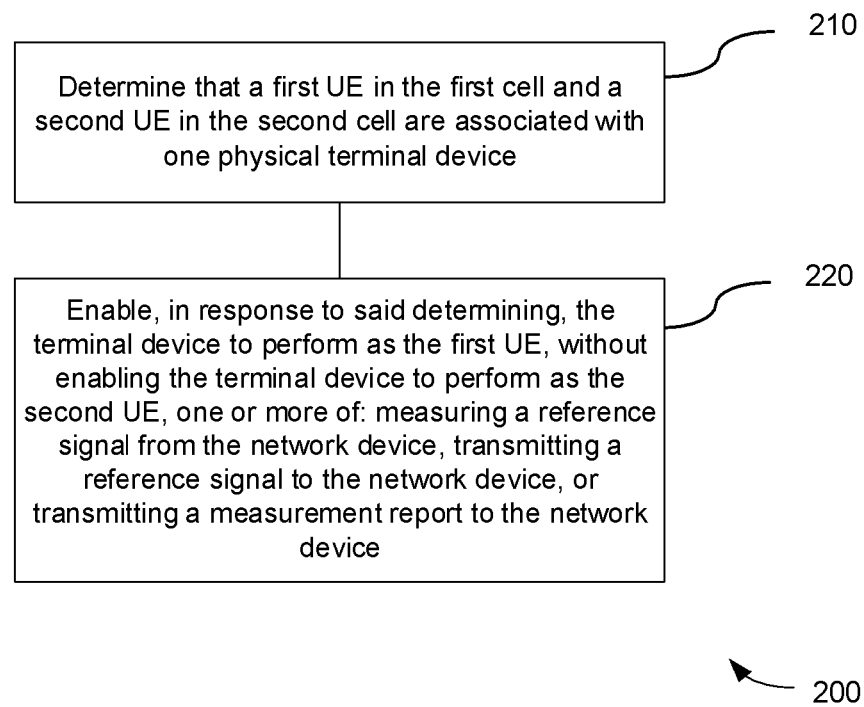
FIG. 2 is a flowchart illustrating a method in a network device according to an embodiment of the present disclosure.

FIG. 2 is a flowchart illustrating a method 200 according to an embodiment of the present disclosure. The method 200 can be performed at a network device, e.g., a gNB, serving a first cell and a second cell. Note that each of the first cell and the second cell may be one or multiple cells.

At block 210, it is determined that a first UE in the first cell and a second UE in the second cell are associated with one physical terminal device.

Here, the terminal device may be equipped with two SIMs, which may be associated with one single operator or two different operators. In either case, from the perspective of the network device, the terminal device is logically seen as two different UEs, i.e., the first UE and the second UE.

In particular, the determination in the block 210 can be made based on a similarity between first CSI reported from the first UE and second CSI reported from the second UE. For example, each of the first CSI and the second CSI may include a Channel Quality Indicator (CQI), a Precoding Matrix Indicator (PMI), and/or a Rank Indicator (RI). Additionally or alternatively, the determination in the block 210 can be made based on a similarity between i) a first path loss between the first UE and the network device and ii) a second path loss between the second UE and the network device. Here, the first path loss can be derived from a power headroom report from the first UE, and likewise the second path loss can be derived from a power headroom report from the second UE. Additionally or alternatively, the determination in the block 210 can be made based on a consistency between first capability or feature information of the first UE and second capability or feature information of the second UE. Here, each of the first capability or feature information and the second first capability or feature information may include a UE category, and/or may indicate a number of antennas equipped at the corresponding UE, a maximum data rate supported by the corresponding UE, a highest Modulation and Coding Scheme (MCS) supported by the corresponding UE, or the like. In other words, in the block 210, it can be determined that the first UE and the second UE are associated with one physical terminal device when the first CSI and the second CSI are similar (e.g., with a difference smaller than a predefined threshold), the first path loss and the second pass loss are similar (e.g., with a difference smaller than a predefined threshold), and/or when the first capability or feature information and the second first capability or feature information are consistent with each other.

Further to the above described CSI, path loss and capability or feature information, which can be referred to as coarse or large-scale factors herein, the determination in the block 210 can be made further on a coherence between a first channel matrix from the first UE to the network device and a second channel matrix from the second UE to the network device. In particular, let $H_1$ denote the first channel matrix and $H_2$ denote the second channel matrix, $H_1$ and $H_2$ can be considered as highly coherent when $H_1 H_2$ (where * represents conjugate transposition) is approximately a diagonal matrix (i.e., when the amplitudes of its diagonal elements are much higher than those of the non-diagonal elements, e.g., by several orders). The channel coherence, which can be referred to as a fine or small-scale factor herein, can be applied only when the first UE and the second UE are determined, based on one or more large-scale factors, to be associated with one single physical terminal device. In the block 210, it can be determined that the first UE and the second UE are associated with one physical terminal device when $H_1$ and $H_2$ are determined to be highly coherent with each other.

In an example, $H_1$ and $H_2$ can be obtained, e.g., by means of channel estimation, by a first process and a second process running in the network device for serving the first cell and the second cell, respectively. The first process and the second process can share the channel information, e.g., $H_1$ and $H_2$, with each other.

At block 220, in response to the determination in the block 210, the network device enables the terminal device to perform as the first UE, without enabling the terminal device to perform as the second UE, one or more of the following operations: measuring a reference signal (e.g., Channel State Information-Reference Signal, or CSI-RS) from the network device, transmitting a reference signal (e.g., Sounding Reference Signal, or SRS) to the network device, or transmitting a measurement report (e.g., a measurement report for a CSI-RS or a power headroom report) to the network device.

That is, the network device allows only the first UE to perform these operations, while prevents the second UE from performing the same operations. For example, this can be done by transmitting (e.g., via Radio Resource Control, or RRC, signaling) to the terminal device an instruction to release a CSI-RS resource allocated to the second UE and transmitting to the terminal device an instruction to refrain from measuring and reporting CSI on the released CSI-RS resource, or transmitting (e.g., via RRC signaling) to the terminal device an instruction to release an SRS resource allocated to the second UE, and refraining from triggering the terminal device to transmit a power headroom report as the second UE.

In an example, the first cell and the second cell may be associated with different operators, as in the above described MOCN scenario. Accordingly, the first UE and the second UE can be associated with two SIMs for two different operators, respectively, e.g., SIM 1 associated with Operator A and SIM 2 associated with Operator B. The first cell and the second cell may share one set of radio and baseband resources, as shown in FIG. 1. In this case, a measurement report received from the first UE can be shared with the second cell. For example, the first process can share a measurement report received from the first UE with the second process.

In another example, the first cell may be same as the second cell. Accordingly, the first UE and the second UE can be associated with two SIMs for one and the same operator, respectively, e.g., SIM 1 and SIM 2 both associated with Operator A.

With the two SIMs, whether associated with two different operators or with one single operator, the terminal device may operate in either Dual SIM Dual Standby (DSDS) mode or Dual SIM Dual Activity (DSDA) mode. The above method 200 can be applied equally to these modes.

Figure 3:
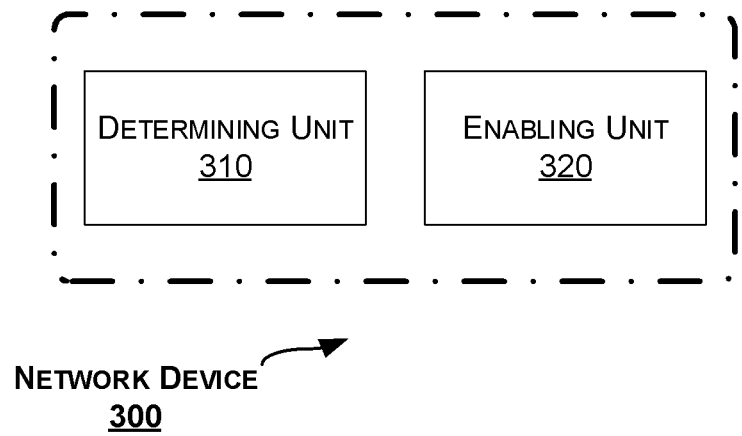
FIG. 3 is a block diagram of a network device according to an embodiment of the present disclosure.

Correspondingly to the method 100 as described above, a network device is provided. FIG. 3 is a block diagram of a network device 300 according to an embodiment of the present disclosure. The network device 300 can serve a first cell and a second cell, and can be e.g., a gNB.

As shown in FIG. 3, the network device 300 includes a determining unit 310 configured to determine that a first UE in the first cell and a second UE in the second cell are associated with one physical terminal device. The network device 300 further includes an enabling unit configured to enable, in response to the determining, the terminal device to perform as the first UE, without enabling the terminal device to perform as the second UE, one or more of: measuring a reference signal from the network device, transmitting a reference signal to the network device, or transmitting a measurement report to the network device.

In an embodiment, the determining unit 310 can be configured to determine that the first UE and the second UE are associated with one physical terminal device based on one or more of: a similarity between first CSI reported from the first UE and second CSI reported from the second UE, a similarity between i) a first path loss between the first UE and the network device and ii) a second path loss between the second UE and the network device, and a consistency between first capability or feature information of the first UE and second capability or feature information of the second UE.

In an embodiment, each of the first CSI and the second CSI may include a CQI, a PMI, and/or an RI.

In an embodiment, each of the first capability or feature information and the second first capability or feature information may include a UE category.

In an embodiment, the determining unit 310 can be configured to determine that the first UE and the second UE are associated with one physical terminal device based further on a coherence between a first channel matrix from the first UE to the network device and a second channel matrix from the second UE to the network device.

In an embodiment, the enabling unit 320 can be configured to perform one or more of: transmitting to the terminal device an instruction to release a CSI-RS resource allocated to the second UE and transmitting to the terminal device an instruction to refrain from measuring and reporting CSI on the released CSI-RS resource, transmitting to the terminal device an instruction to release an SRS resource allocated to the second UE, and refraining from triggering the terminal device to transmit a power headroom report as the second UE.

In an embodiment, the first cell may be associated with a first operator and the second cell may be associated with a second operator different from the first operator.

In an embodiment, the network device 300 may further include a sharing unit configured to share with the second cell a measurement report received from the first UE.

In an embodiment, the first cell and the second cell may share one set of radio and baseband resources.

In an embodiment, the first cell may be same as the second cell.

The determining unit 310 and the enabling unit 320 can be implemented as a pure hardware solution or as a combination of software and hardware, e.g., by one or more of: a processor or a micro-processor and adequate software and memory for storing of the software, a Programmable Logic Device (PLD) or other electronic component(s) or processing circuitry configured to perform the actions described above, and illustrated, e.g., in FIG. 2.

Figure 4:
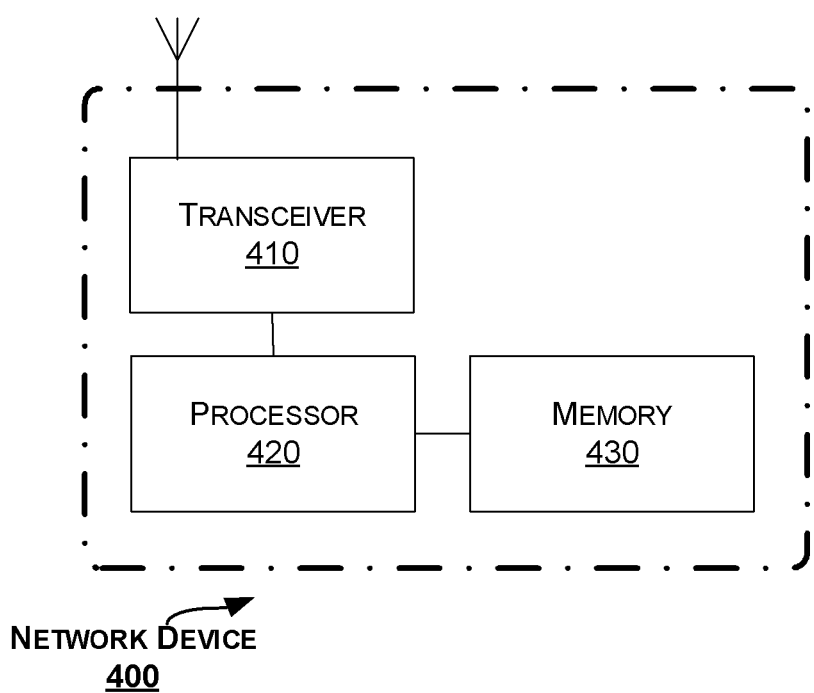
FIG. 4 is a block diagram of a network device according to another embodiment of the present disclosure.

FIG. 4 is a block diagram of a network device 400 according to another embodiment of the present disclosure. The network device 400 can serve a first cell and a second cell, and can be e.g., a gNB.

The network device 400 includes a transceiver 410, a processor 420 and a memory 430. The memory 430 contains instructions executable by the processor 420 whereby the network device 400 is operative to perform the actions, e.g., of the procedure described earlier in conjunction with FIG. 2. Particularly, the memory 430 contains instructions executable by the processor 420 whereby the network device 400 is operative to: determine that a first UE in the first cell and a second UE in the second cell are associated with one physical terminal device; and enable, in response to the determining, the terminal device to perform as the first UE, without enabling the terminal device to perform as the second UE, one or more of: measuring a reference signal from the network device, transmitting a reference signal to the network device, or transmitting a measurement report to the network device.

In an embodiment, the operation of determining may be based on one or more of: a similarity between first CSI reported from the first UE and second CSI reported from the second UE, a similarity between i) a first path loss between the first UE and the network device and ii) a second path loss between the second UE and the network device, and a consistency between first capability or feature information of the first UE and second capability or feature information of the second UE.

In an embodiment, each of the first CSI and the second CSI may include a CQI, a PMI, and/or an RI.

In an embodiment, each of the first capability or feature information and the second first capability or feature information may include a UE category.

In an embodiment, the operation of determining may be based further on a coherence between a first channel matrix from the first UE to the network device and a second channel matrix from the second UE to the network device.

In an embodiment, the operation of enabling the terminal device to perform as the first UE, without enabling the terminal device to perform as the second UE, one or more of measuring a reference signal from the network device, transmitting a reference signal to the network device, or transmitting a measurement report to the network device may include one or more of: transmitting to the terminal device an instruction to release a CSI-RS resource allocated to the second UE and transmitting to the terminal device an instruction to refrain from measuring and reporting CSI on the released CSI-RS resource, transmitting to the terminal device an instruction to release an SRS resource allocated to the second UE, and refraining from triggering the terminal device to transmit a power headroom report as the second UE.

In an embodiment, the first cell may be associated with a first operator and the second cell may be associated with a second operator different from the first operator.

In an embodiment, the memory 430 may further contain instructions executable by the processor 420 whereby the network device 400 is operative to: share with the second cell a measurement report received from the first UE.

In an embodiment, the first cell and the second cell may share one set of radio and baseband resources.

In an embodiment, the first cell may be same as the second cell.

The present disclosure also provides at least one computer program product in the form of a non-volatile or volatile memory, e.g., a non-transitory computer readable storage medium, an Electrically Erasable Programmable Read-Only Memory (EEPROM), a flash memory and a hard drive. The computer program product includes a computer program. The computer program includes:

code/computer readable instructions, which when executed by the processor 420 causes the network device 400 to perform the actions, e.g., of the procedure described earlier in conjunction with FIG. 2.

The computer program product may be configured as a computer program code structured in computer program modules. The computer program modules could essentially perform the actions of the flow illustrated in FIG. 2.

The processor may be a single CPU (Central Processing Unit), but could also comprise two or more processing units. For example, the processor may include general purpose microprocessors; instruction set processors and/or related chips sets and/or special purpose microprocessors such as Application Specific Integrated Circuits (ASICs). The processor may also comprise board memory for caching purposes. The computer program may be carried by a computer program product connected to the processor. The computer program product may comprise a non-transitory computer readable storage medium on which the computer program is stored. For example, the computer program product may be a flash memory, a Random Access Memory (RAM), a Read-Only Memory (ROM), or an EEPROM, and the computer program modules described above could in alternative embodiments be distributed on different computer program products in the form of memories.

Figure 5:
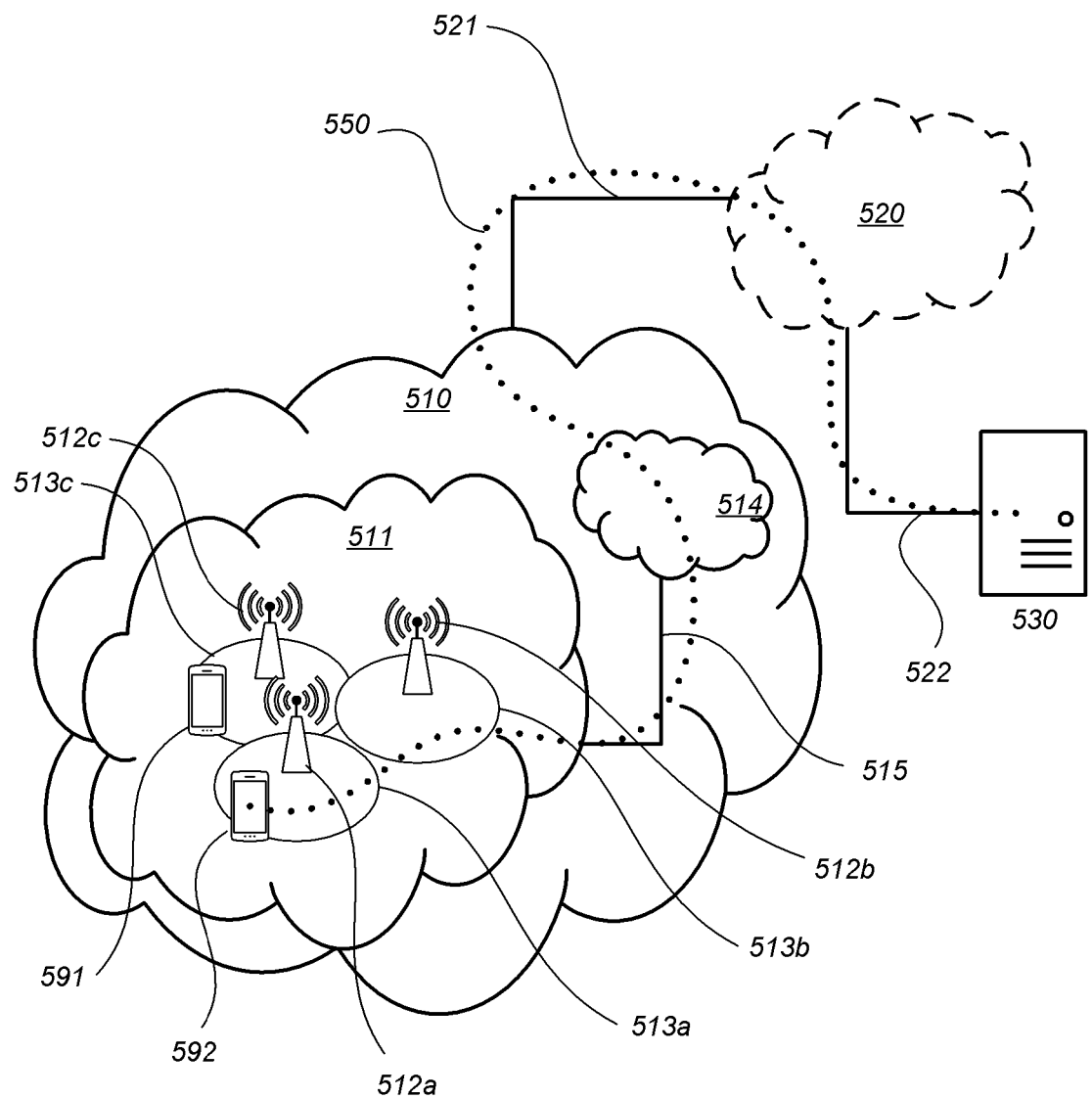
FIG. 5 schematically illustrates a telecommunication network connected via an intermediate network to a host computer.

With reference to FIG. 5, in accordance with an embodiment, a communication system includes a telecommunication network 510, such as a 3GPP-type cellular network, which comprises an access network 511, such as a radio access network, and a core network 514. The access network 511 comprises a plurality of base stations 512a, 512b, 512c, such as NBs, eNBs, gNBs or other types of wireless access points, each defining a corresponding coverage area 513a, 513b, 513c. Each base station 512a, 512b, 512c is connectable to the core network 514 over a wired or wireless connection 515. A first user equipment (UE) 591 located in coverage area 513c is configured to wirelessly connect to, or be paged by, the corresponding base station 512c. A second UE 592 in coverage area 513a is wirelessly connectable to the corresponding base station 512a. While a plurality of UEs 591, 592 are illustrated in this example, the disclosed embodiments are equally applicable to a situation where a sole UE is in the coverage area or where a sole UE is connecting to the corresponding base station 512.

The telecommunication network 510 is itself connected to a host computer 530, which may be embodied in the hardware and/or software of a standalone server, a cloud-implemented server, a distributed server or as processing resources in a server farm. The host computer 530 may be under the ownership or control of a service provider, or may be operated by the service provider or on behalf of the service provider. The connections 521, 522 between the telecommunication network 510 and the host computer 530 may extend directly from the core network 514 to the host computer 530 or may go via an optional intermediate network 520. The intermediate network 520 may be one of, or a combination of more than one of, a public, private or hosted network; the intermediate network 520, if any, may be a backbone network or the Internet; in particular, the intermediate network 520 may comprise two or more sub-networks (not shown).

The communication system of FIG. 5 as a whole enables connectivity between one of the connected UEs 591, 592 and the host computer 530. The connectivity may be described as an over-the-top (OTT) connection 550. The host computer 530 and the connected UEs 591, 592 are configured to communicate data and/or signaling via the OTT connection 550, using the access network 511, the core network 514, any intermediate network 520 and possible further infrastructure (not shown) as intermediaries. The OTT connection 550 may be transparent in the sense that the participating communication devices through which the OTT connection 550 passes are unaware of routing of uplink and downlink communications. For example, a base station 512 may not or need not be informed about the past routing of an incoming downlink communication with data originating from a host computer 530 to be forwarded (e.g., handed over) to a connected UE 591. Similarly, the base station 512 need not be aware of the future routing of an outgoing uplink communication originating from the UE 591 towards the host computer 530.

Example implementations, in accordance with an embodiment, of the UE, base station and host computer discussed in the preceding paragraphs will now be described with reference to FIG. 6. In a communication system 600, a host computer 610 comprises hardware 615 including a communication interface 616 configured to set up and maintain a wired or wireless connection with an interface of a different communication device of the communication system 600. The host computer 610 further comprises processing circuitry 618, which may have storage and/or processing capabilities. In particular, the processing circuitry 618 may comprise one or more programmable processors, application-specific integrated circuits, field programmable gate arrays or combinations of these (not shown) adapted to execute instructions. The host computer 610 further comprises software 611, which is stored in or accessible by the host computer 610 and executable by the processing circuitry 618. The software 611 includes a host application 612. The host application 612 may be operable to provide a service to a remote user, such as a UE 630 connecting via an OTT connection 650 terminating at the UE 630 and the host computer 610. In providing the service to the remote user, the host application 612 may provide user data which is transmitted using the OTT connection 650.

The communication system 600 further includes a base station 620 provided in a telecommunication system and comprising hardware 625 enabling it to communicate with the host computer 610 and with the UE 630. The hardware 625 may include a communication interface 626 for setting up and maintaining a wired or wireless connection with an interface of a different communication device of the communication system 600, as well as a radio interface 627 for setting up and maintaining at least a wireless connection 670 with a UE 630 located in a coverage area (not shown in FIG. 6) served by the base station 620. The communication interface 626 may be configured to facilitate a connection 660 to the host computer 610. The connection 660 may be direct or it may pass through a core network (not shown in FIG. 6) of the telecommunication system and/or through one or more intermediate networks outside the telecommunication system. In the embodiment shown, the hardware 625 of the base station 620 further includes processing circuitry 628, which may comprise one or more programmable processors, application-specific integrated circuits, field programmable gate arrays or combinations of these (not shown) adapted to execute instructions. The base station 620 further has software 621 stored internally or accessible via an external connection.

The communication system 600 further includes the UE 630 already referred to. Its hardware 635 may include a radio interface 637 configured to set up and maintain a wireless connection 670 with a base station serving a coverage area in which the UE 630 is currently located. The hardware 635 of the UE 630 further includes processing circuitry 638, which may comprise one or more programmable processors, application-specific integrated circuits, field programmable gate arrays or combinations of these (not shown) adapted to execute instructions. The UE 630 further comprises software 631, which is stored in or accessible by the UE 630 and executable by the processing circuitry 638. The software 631 includes a client application 632. The client application 632 may be operable to provide a service to a human or non-human user via the UE 630, with the support of the host computer 610. In the host computer 610, an executing host application 612 may communicate with the executing client application 632 via the OTT connection 650 terminating at the UE 630 and the host computer 610. In providing the service to the user, the client application 632 may receive request data from the host application 612 and provide user data in response to the request data. The OTT connection 650 may transfer both the request data and the user data. The client application 632 may interact with the user to generate the user data that it provides.

Figure 6:
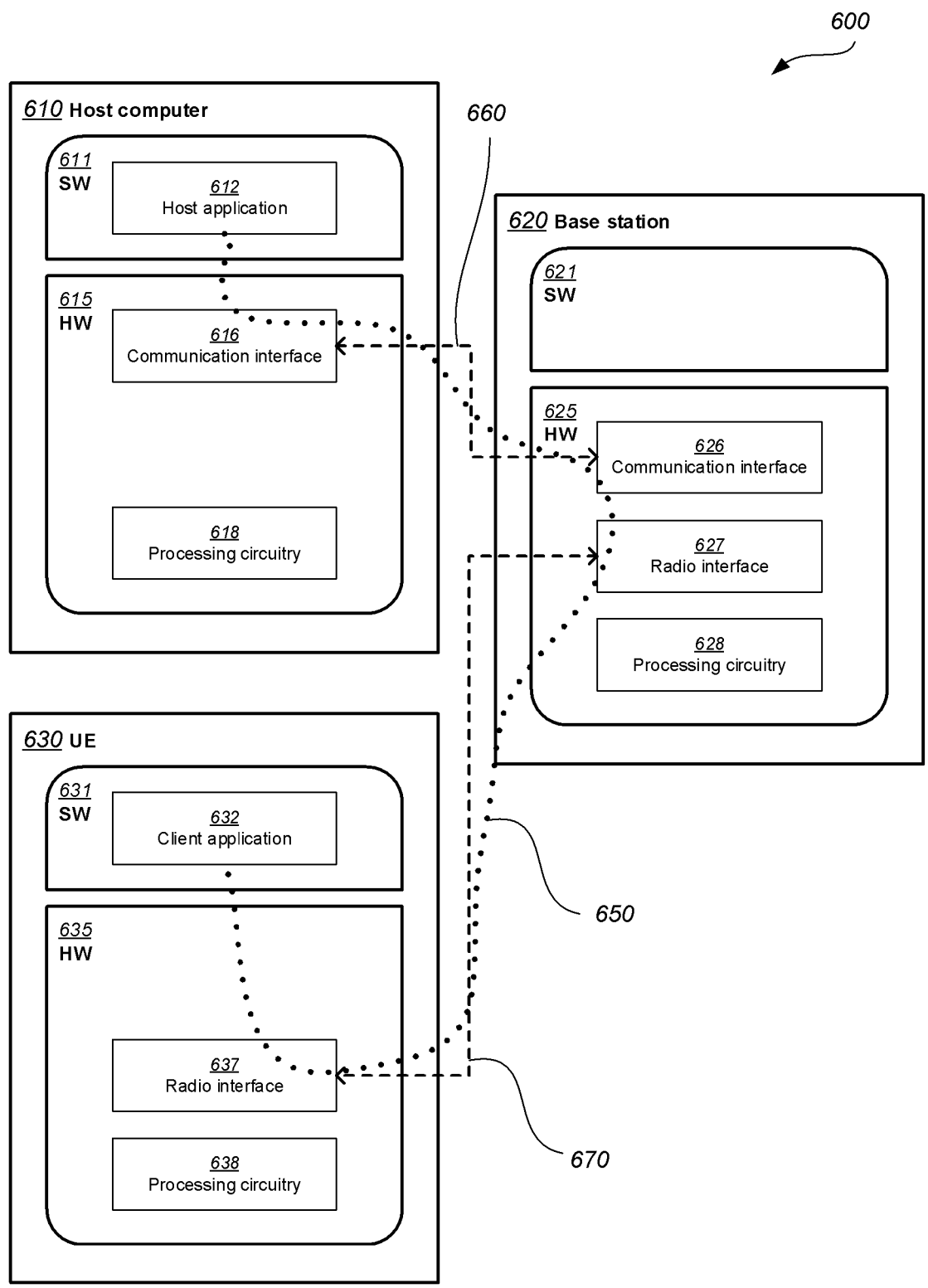
FIG. 6 is a generalized block diagram of a host computer communicating via a base station with a user equipment over a partially wireless connection.

It is noted that the host computer 610, base station 620 and UE 630 illustrated in FIG. 6 may be identical to the host computer 530, one of the base stations 512a, 512b, 512c and one of the UEs 591, 592 of FIG. 5, respectively. This is to say, the inner workings of these entities may be as shown in FIG. 6 and independently, the surrounding network topology may be that of FIG. 5.

In FIG. 6, the OTT connection 650 has been drawn abstractly to illustrate the communication between the host computer 610 and the use equipment 630 via the base station 620, without explicit reference to any intermediary devices and the precise routing of messages via these devices. Network infrastructure may determine the routing, which it may be configured to hide from the UE 630 or from the service provider operating the host computer 610, or both. While the OTT connection 650 is active, the network infrastructure may further take decisions by which it dynamically changes the routing (e.g., on the basis of load balancing consideration or reconfiguration of the network).

The wireless connection 670 between the UE 630 and the base station 620 is in accordance with the teachings of the embodiments described throughout this disclosure. One or more of the various embodiments improve the performance of OTT services provided to the UE 630 using the OTT connection 650, in which the wireless connection 670 forms the last segment. More precisely, the teachings of these embodiments may improve resource utilization and power consumption and thereby provide benefits such as reduced user waiting time and extended battery lifetime.

A measurement procedure may be provided for the purpose of monitoring data rate, latency and other factors on which the one or more embodiments improve. There may further be an optional network functionality for reconfiguring the OTT connection 650 between the host computer 610 and UE 630, in response to variations in the measurement results. The measurement procedure and/or the network functionality for reconfiguring the OTT connection 650 may be implemented in the software 611 of the host computer 610 or in the software 631 of the UE 630, or both. In embodiments, sensors (not shown) may be deployed in or in association with communication devices through which the OTT connection 650 passes; the sensors may participate in the measurement procedure by supplying values of the monitored quantities exemplified above, or supplying values of other physical quantities from which software 611, 631 may compute or estimate the monitored quantities. The reconfiguring of the OTT connection 650 may include message format, retransmission settings, preferred routing etc.; the reconfiguring need not affect the base station 620, and it may be unknown or imperceptible to the base station 620. Such procedures and functionalities may be known and practiced in the art. In certain embodiments, measurements may involve proprietary UE signaling facilitating the host computer's 610 measurements of throughput, propagation times, latency and the like. The measurements may be implemented in that the software 611, 631 causes messages to be transmitted, in particular empty or 'dummy' messages, using the OTT connection 650 while it monitors propagation times, errors etc.

FIG. 7 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 7 will be included in this section. In a first step 710 of the method, the host computer provides user data. In an optional substep 711 of the first step 710, the host computer provides the user data by executing a host application. In a second step 720, the host computer initiates a transmission carrying the user data to the UE. In an optional third step 730, the base station transmits to the UE the user data which was carried in the transmission that the host computer initiated, in accordance with the teachings of the embodiments described throughout this disclosure. In an optional fourth step 740, the UE executes a client application associated with the host application executed by the host computer.

FIG. 8 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 8 will be included in this section. In a first step 810 of the method, the host computer provides user data. In an optional substep (not shown) the host computer provides the user data by executing a host application. In a second step 820, the host computer initiates a transmission carrying the user data to the UE. The transmission may pass via the base station, in accordance with the teachings of the embodiments described throughout this disclosure. In an optional third step 830, the UE receives the user data carried in the transmission.

FIG. 9 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 9 will be included in this section. In an optional first step 910 of the method, the UE receives input data provided by the host computer. Additionally or alternatively, in an optional second step 920, the UE provides user data. In an optional substep 921 of the second step 920, the UE provides the user data by executing a client application. In a further optional substep 911 of the first step 910, the UE executes a client application which provides the user data in reaction to the received input data provided by the host computer. In providing the user data, the executed client application may further consider user input received from the user. Regardless of the specific manner in which the user data was provided, the UE initiates, in an optional third substep 930, transmission of the user data to the host computer. In a fourth step 940 of the method, the host computer receives the user data transmitted from the UE, in accordance with the teachings of the embodiments described throughout this disclosure.

FIG. 10 is a flowchart illustrating a method implemented in a communication system, in accordance with one embodiment. The communication system includes a host computer, a base station and a UE which may be those described with reference to FIGS. 5 and 6. For simplicity of the present disclosure, only drawing references to FIG. 10 will be included in this section. In an optional first step 1010 of the method, in accordance with the teachings of the embodiments described throughout this disclosure, the base station receives user data from the UE. In an optional second step 1020, the base station initiates transmission of the received user data to the host computer. In a third step 1030, the host computer receives the user data carried in the transmission initiated by the base station.

The disclosure has been described above with reference to embodiments thereof. It should be understood that various modifications, alternations and additions can be made by those skilled in the art without departing from the spirits and scope of the disclosure. Therefore, the scope of the disclosure is not limited to the above particular embodiments but only defined by the claims as attached.

The invention claimed is:

1. A method in a network device serving a first cell and a second cell, comprising:
   determining that a first User Equipment, UE, in the first cell and a second UE in the second cell are associated with one physical terminal device based on radio channel characteristics between the network device and the first UE and the second UE and UE capabilities of the first UE and the second UE, wherein the radio channel characteristics are first Channel State Information, CSI, reported from the first UE and second CSI reported from the second UE, and i) a first path loss between the first UE and the network device and ii) a second path loss between the second UE and the network device; and
   enabling, in response to said determining, the terminal device to perform as the first UE, without enabling the terminal device to perform as the second UE, one or more of:
      measuring a reference signal from the network device,
      transmitting a reference signal to the network device, or
      transmitting a measurement report to the network device.

2. The method of claim 1, wherein each of the first CSI and the second CSI comprises a Channel Quality Indicator, CQI, a Precoding Matrix Indicator, PMI, and/or a Rank Indicator, RI.

3. The method of claim 1, wherein the UE capabilities comprises a UE category.

4. The method of claim 1, wherein said determining is based further on a coherence between a first channel matrix from the first UE to the network device and a second channel matrix from the second UE to the network device.

5. The method of claim 1, wherein said enabling the terminal device to perform as the first UE, without enabling the terminal device to perform as the second UE, one or more of measuring a reference signal from the network device, transmitting a reference signal to the network device, or transmitting a measurement report to the network device comprises one or more of:
   transmitting to the terminal device an instruction to release a Channel State Information-Reference Signal, CSI-RS, resource allocated to the second UE and transmitting to the terminal device an instruction to refrain from measuring and reporting CSI on the released CSI-RS resource,
   transmitting to the terminal device an instruction to release a Sounding Reference Signal, SRS, resource allocated to the second UE, and
   refraining from triggering the terminal device to transmit a power headroom report as the second UE.

6. The method of claim 1, wherein the first cell is associated with a first operator and the second cell is associated with a second operator different from the first operator.

7. The method of claim 6, further comprising:
sharing with the second cell a measurement report received from the first UE.

8. The method of claim 6, wherein the first cell and the second cell share one set of radio and baseband resources.

9. The method of claim 1, wherein the first cell is same as the second cell.

10. A network device comprising a transceiver, a processor and a memory, the memory comprising instructions executable by the processor whereby the network device is operative to:
determine that a first User Equipment, UE, in the first cell and a second UE in the second cell are associated with one physical terminal device based on radio channel characteristics between the network device and the first UE and the second UE and UE capabilities of the first UE and the second UE, wherein the radio channel characteristics are first Channel State Information, CSI, reported from the first UE and second CSI reported from the second UE, and i) a first path loss between the first UE and the network device and ii) a second path loss between the second UE and the network device; and
enable, in response to said determining, the terminal device to perform as the first UE, without enabling the terminal device to perform as the second UE, one or more of:
measuring a reference signal from the network device, transmitting a reference signal to the network device, or transmitting a measurement report to the network device.

* * * * *